Feb. 3, 1970   H. LANDWEHRKAMP ET AL   3,492,804
SENSOR-ACTUATED STRAND CLAMPING AND STRAND
RETURN MECHANISM FOR SPINNING APPARATUS
Filed Sept. 1, 1967   9 Sheets-Sheet 1

INVENTORS
HANS LANDWEHRKAMP
FRANZ SCHREYER
KARL HANDSCHUCH
ADOLF SCHILTKNECHT

ATTORNEY

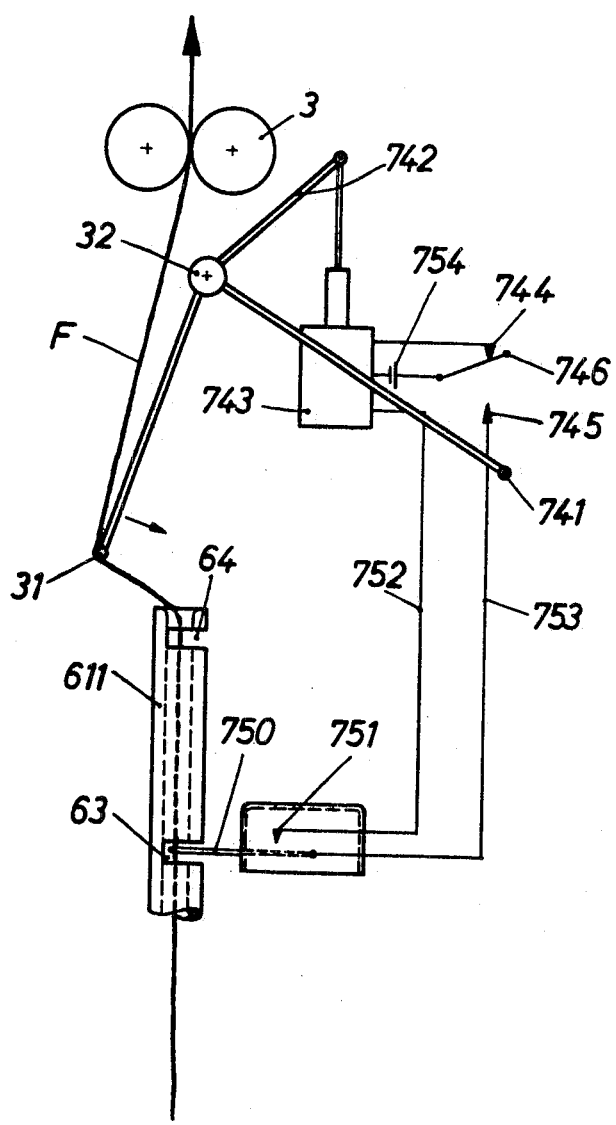

United States Patent Office 3,492,804
Patented Feb. 3, 1970

3,492,804
SENSOR-ACTUATED STRAND CLAMPING AND STRAND RETURN MECHANISM FOR SPINNING APPARATUS
Hans Landwehrkamp and Franz Schreyer, Ingolstadt, and Karl Handschuch, Oberhaunstadt, Germany, and Adolf Schiltknecht, Winterthur, Switzerland, assignors to Schubert & Salzer Maschinenfabrik Aktiengesellschaft, Ingolstadt, Germany, a corporation of Germany
Filed Sept. 1, 1967, Ser. No. 665,118
Claims priority, application Germany, Sept. 3, 1966, Sch 39,488
Int. Cl. D01h 13/16, 7/00, 13/18
U.S. Cl. 57—80
16 Claims

ABSTRACT OF THE DISCLOSURE

A clamp located between strand-twisting mechanism and strand-drawing mechanism may be a slide or a swinging arm movable to bear against a complemental surface, or a contractable elastic member, which grips the strand to prevent the strand end from being withdrawn from the spinning apparatus. Movement of a guide to increase the length of the strand stretch between the clamp and drawing mechanism may be synchronized with gripping movement of the clamp. Such guide is movable reversely when the clamp is released to provide slack in the stretch which permits the strand end to drop into the spinning chamber. A mechanical or photoelectric sensor responsive to decrease in strand tension or to the absence of strand actuates the clamp. The clamp may be released either voluntarily, or by actuation of the spinning apparatus, or by means operable by or in synchronism with the clamp or guide.

---

In continuous-spinning devices the fiber sliver is supplied to a spinning chamber which has an area for collecting fiber from the sliver and binding it to form a strand to which twist is applied for producing yarn. The strand is withdrawn from the spinning apparatus by drawing mechanism exteriorly of the apparatus. The drawing process is continuous so that the spinning apparatus must have an opening in it through which the strand can be withdrawn whether such apparatus is a cup-shaped rotary chamber such as shown in copending application Ser. No. 655,906 of Landwehrkamp and Schreyer, filed July 25, 1967, for Method and Apparatus for Cleaning Rotary Spinning Chamber, or is a rotating funnel to which fiber is fed electrostatically as disclosed in French Patent 1,442,699, or is a chamber into which the fiber particles are carried by fluid and collected by the free-rotating end of a strand, such as disclosed in German Patent 1,062,153.

In all devices of the continuous-spinning type, when the spinning process is stopped or the strand breaks in the spinning apparatus the withdrawing apparatus continues ot pull the strand from the machine or, if the withdrawing apparatus is stopped, the tension in the strand caused by the twist being formed in it will cause the strand to spring out of the spinning apparatus when the tension on its inner end is released. In order to start the spinning process again the free end of the strand must be fed back into the apparatus through an opening provided for its withdrawal until its end is again in a position to collect fiber fed to the machine. Such return feed of the strand end has been done manually, or by a strand gripper which is mounted on a track extending between the opening and the drawing mechanism. With the latter device, the gripper would slide along its track toward the opening, but a suction source must be provided to pull the strand end from the opening into the fiber-collection area of the machine. Also, it is necessary to provide mechanism for reversing the direction of movement of the drawing apparatus in order to permit the strand to be pulled or dropped back into the collection area.

In machines where the drawing apparatus includes a pair of drawing rollers, it has been suggested that winding and unwinding rollers be rigidly coupled by reduction gearing and that electric-sensing means be provided to energize mechanism for activating the unwinding rollers for a predetermined number of revolutions in order to return the strand end to the collection area and then to activate the winding rollers. This type of mechanism is shown in United States Patent 3,354,631. This apparatus can be effective only if the gripper grasps the strand a sufficient distance above its free end so that the free end remains within the spinning machine while the gripper moves along the track toward the drawing mechanism until it comes to a stop. Such movement of the gripper would be necessary to prevent a sharp jerk being exerted on the strand when the gripper takes hold. As mentioned above, however, the strand tends to jump out of the spinning machine when the tension induced by the spinning and twisting operation is released suddenly. Even if the free strand end remains in the machine initially, an air draft or other disturbance near the opening may flip the strand end out of the machine. Consequently, in all of the known devices some means for feeding strand back into the machine is required.

It is therefore a principal object of the present invention to provide clamping means for preventing removal of the free strand end from an opening in a continuous-spinning machine either when the spinning machine is stopped or when the strand breaks.

It is a further important object to provide means of simple construction which cooperates with the clamping means to return the strand end to the fiber-collection area of the spinning machine when the clamping means are released for resumption of the spinning operation.

An additional object is to provide such clamping and strand-end return apparatus which is economical and which can operate automatically and reliably to start the spinning operation or to restart such operation after strand breakage.

FIGURES 9, 10 and 11 are similar diagrammatic elevations of a spinning chamber, withdrawal opening and strand-drawing rolls including strand-clamping means and strand-end return mechanism in different operative positions.

Figure 1:
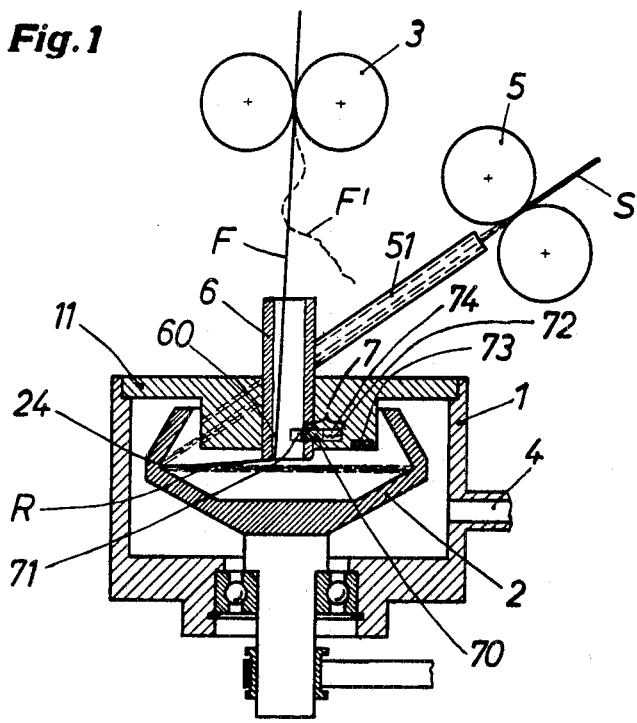
FIGURE 1 is a vertical section through spinning apparatus having a strand-clamping mechanism in accordance with the present invention and FIGURE 2 is a top plan of such apparatus.

Shown in FIGURE 1 is a rotary spinning chamber 2 enclosed in a stationary housing 1 having a cover 11. A fiber sliver S is fed through rolls 5 and feed tube 51 extending through cover 11 into strand-forming chamber 2 to direct the sliver toward the wall of the chamber interior. Fibers, separated by a higher rate of velocity of the rolls 5 as of the supply of the silver S, are moved by centrifugal action to the portion of the chamber having the greatest diameter, which portion defines a fiber-collection channel. Fibers in the channel form a ring R which is spun into a strand F and then twisted into yarn and the strand is withdrawn through a stationary tube 6 in cover 11 by drawing rolls 3. If rotation of the spinning chamber is stopped, the tension on the inner strand end caused by the chamber rotation is released so that the strand pulls free from the fiber ring R and springs upward through tube 6 toward drawing rolls 3. Even if the drawing rolls are stopped simultaneously with the spinning chamber, the sudden release of tension caused by twist in the strand will cause the free strand end to move upward toward the open outer end of the tube. If the strand end is not pulled or does not spring completely out of tube 6, a draft blowing past the strand stretch between rollers 3 and the tube opening may pull the strand end from the tube as indicated by the broken line F'.

In order to resume the spinning operation, the strand end must be manually inserted into the tube and rotation of the drawing rolls reversed to provide a sufficient length of strand to extend into the strand-forming chamber 2 adjacent to its collection channel 24.

To hold the strand in withdrawal tube 6 so that it is not necessary to reinsert the strand end into the spinning chamber a clamp 7 is provided between the spinning chamber and drawing rolls 3 to clamp the strand before its free end has moved an appreciable distance out of the chamber. The clamp includes a slide 70 slidable in guide channel 71 in cover 11 extending transversely of tube 6. In clamping position slide 70 bears against the left wall 60 of tube 6 as seen in FIGURE 1, which is opposite the clamp guide channel, and thereby clamps strand F between the slide and the tube wall.

The slide 70 can be actuated pneumatically, electromagnetically or mechanically, either voluntarily or automatically, and may be actuated for a single spinning chamber or for several spinning chambers simultaneously. For example, the slide may be actuated automatically simultaneously with stoppage of supply rolls 5, spinning chamber 2 and drawing rolls 3 to hold strand F in tube 6 when the spinning tension is relaxed by such stoppage.

Figure 2:
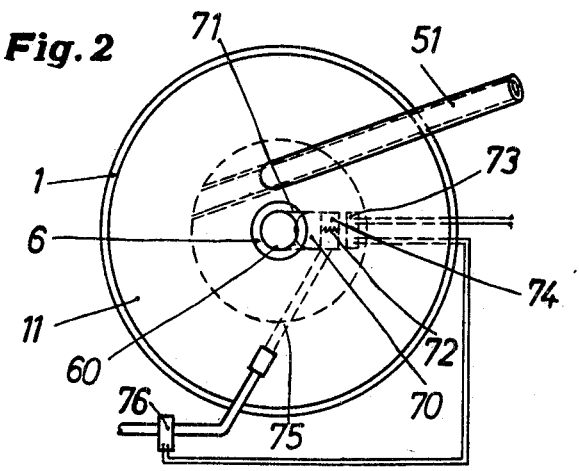

In FIGURE 2 the slide or piston 70 is moved toward tube wall 60 into strand-clamping position by compressed air supplied through conduit 75 to a space 74 on the side of the slide remote from wall 60. The slide is returned to released position by tension spring 72 when the compressed air supply is interrupted.

For automatic actuation of slide 70 a pressure-responsive switch 73 is mounted on the inner side of cover 11. A tube 4 in communication with housing 1 is connected to a suction source to provide a vacuum in the spinning chamber when the chamber is in operation. When the chamber rotation is stopped, the vacuum source is turned off and the pressure in the chamber rises to actuate switch 73. Such switch energizes solenoid valve 76 in conduit 75 to supply compressed air to move piston 70 into strand-clamping engagement with the wall 60. When a vacuum is again created in the chamber 2 as its rotation is started, the contact of switch 73 is broken, solenoid valve 76 is de-energized and spring 72 returns slide 70 to the right into its released position, as shown in FIGURE 2, to release strand F.

Figure 4:
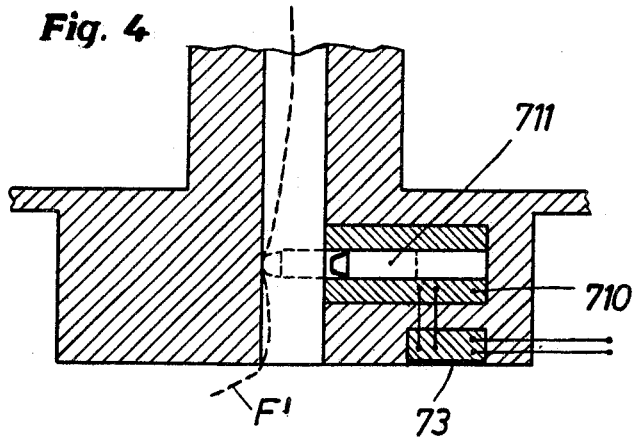
FIGURE 4 is a fragmentary vertical section through the withdrawal portion of spinning apparatus showing a further modified strand-clamping device.

In FIGURE 4 an electromagnetically-operated strand clamp is shown. The slide 711 is moved into the solid-line position by an electromagnet 710 in which position the slide remains during rotation of the spinning chamber. Pressure-sensitive switch 73 is connected to such electromagnet so that when the chamber and vacuum source are stopped the switch reverses the direction of the direct current flowing through electromagnet 710 to reverse its polarity and urge slide 711 to the broken-line position clamping strand F'.

Figure 3:
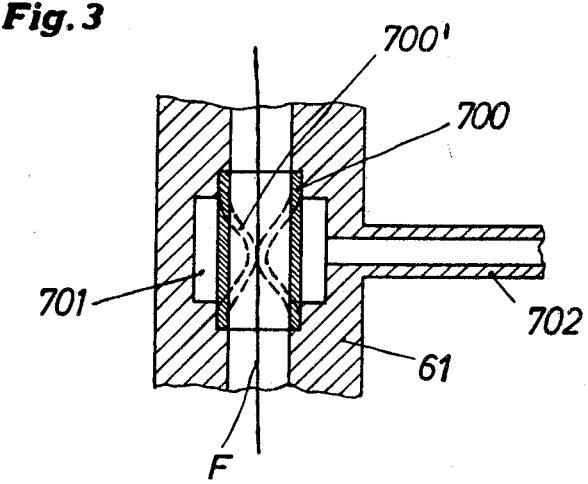
FIGURE 3 is an axial section through a strand-withdrawal tube showing a clamping device with parts broken away.

In FIGURE 3 an elastic sleeve 700 is provided in the bore of withdrawal tube 61 along a minor portion of the length of the tube. An annular cavity 701 sealed from the tube bore and encircling the sleeve communicates with a fluid-supply conduit 702. Compressed air supplied to the cavity through such conduit will exert pressure on the sleeve to collapse it to the broken-line position 700' to pinch the strand F moving axially through such bore. When the compressed air is interrupted, the sleeve will resume its unflexed bore-lining position because of its elasticity.

A pressure-responsive switch 73 has been described in connection with FIGURES 2 and 4 for actuating the clamping mechanism when the rotation of spinning chamber 2 is interrupted. The pressure in the chamber would not change, however, if the strand were simply to break so that the switch would not be energized to actuate the strand clamp. Consequently, it is desirable to provide a sensing mechanism which is responsive to the decrease in strand tension resulting from a break in the strand.

Figure 5:
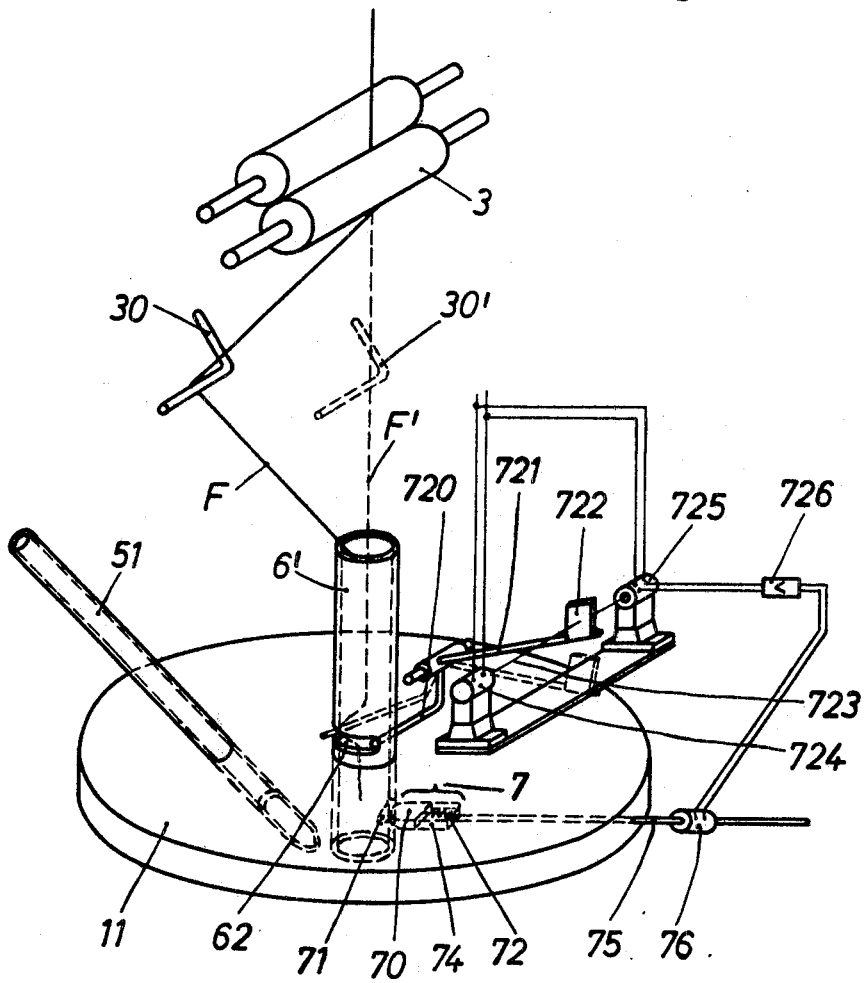
FIGURE 5 is a somewhat diagrammatic top perspective of a spinning-machine cover, withdrawal opening and strand-drawing rolls showing clamping, releasing and return-feed mechanism of the present invention.

FIGURE 5 shows a different type of mechanism for actuating valve 76 for supplying compressed air through conduit 75 to cavity 74 of the strand-clamping mechanism 7. Such air moves piston 70 through slot 71 into the bore of withdrawal tube 6'. An arm 720 has a free end extending through slots 62 in withdrawal tube 6' and transversely through the tube bore. The opposite arm end is connected to a pivot sleeve 727. Also connected to such pivot sleeve is one end of an arm 721 having a flag 722 on its opposite end which normally breaks the light beam between a light source 724 and a photoelectric cell 725. Arm 720 is normally held in the solid-line stressed position by the normal spinning tension in the strand. When the strand tension is decreased substantially, such as by breaking of the strand or when the spinning chamber stops rotating, arm 720 will swing to the unstressed position, as indicated in broken lines, the resulting rotation of sleeve 727 moves flag 722 into its broken-line position to enable the light beam from light source 724 to strike and activate photoelectric cell 725. The signal produced by the photoelectric cell and amplified by amplifier 726 energizes valve 76 for supplying compressed air to move piston 70 into strand-clamping position. When normal tension is restored in the strand F' pressure of the strand on arm 720 will move its flag 722 into the solid-line position in which the flag will interrupt the light beam and de-energize valve 76. If the strand end had been withdrawn from the strand-forming chamber when the spinning chamber was stopped, the strand clamp must be released and the strand end returned to the vicinity of the collection channel. Consequently, supplementary control means may be provided to move arm 721 and flag 722 positively into the solid-line position of FIGURE 5, or an overriding control for valve 76 may be provided to interrupt the compressed air supply to the piston without de-energizing the photoelectric cell, or the photoelectric cell may be de-energized by interposing a shutter other than flag 722 between it and the light source.

When the strand end has been withdrawn from the collection channel vicinity, it must be returned to such vicinity. This could be done manually or by other known methods, but it is preferable that such strand-end return be effected automatically when the strand clamp is released. This may be accomplished by providing a guide 30 offset from the axis of tube 6' between the outer tube end and drawing rolls 3. By passing the strand around such guide the strand stretch between the tube outer end and the drawing rolls 3 is considerably greater than the linear distance between such tube end and such rolls. Guide 30 may be movably mounted so that, prior to or simultaneously with release of clamp 70, such guide can be moved into the broken-line position 30' in line with the axis of tube 6'. Such movement of the guide will enable the strand end to drop by gravity and the action of the suction device into the spinning chamber. The amount of movement of guide 30 required to accomplish this result will be determined by the distance between clamp 70 and the collection channel.

Figure 9:
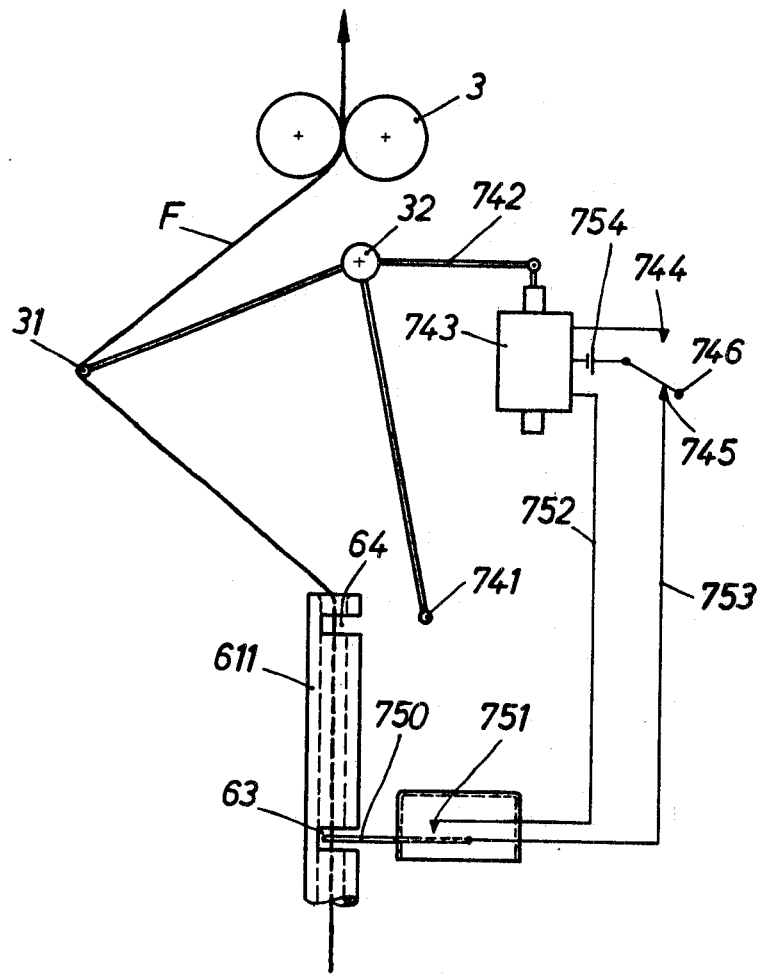
Figure 10:
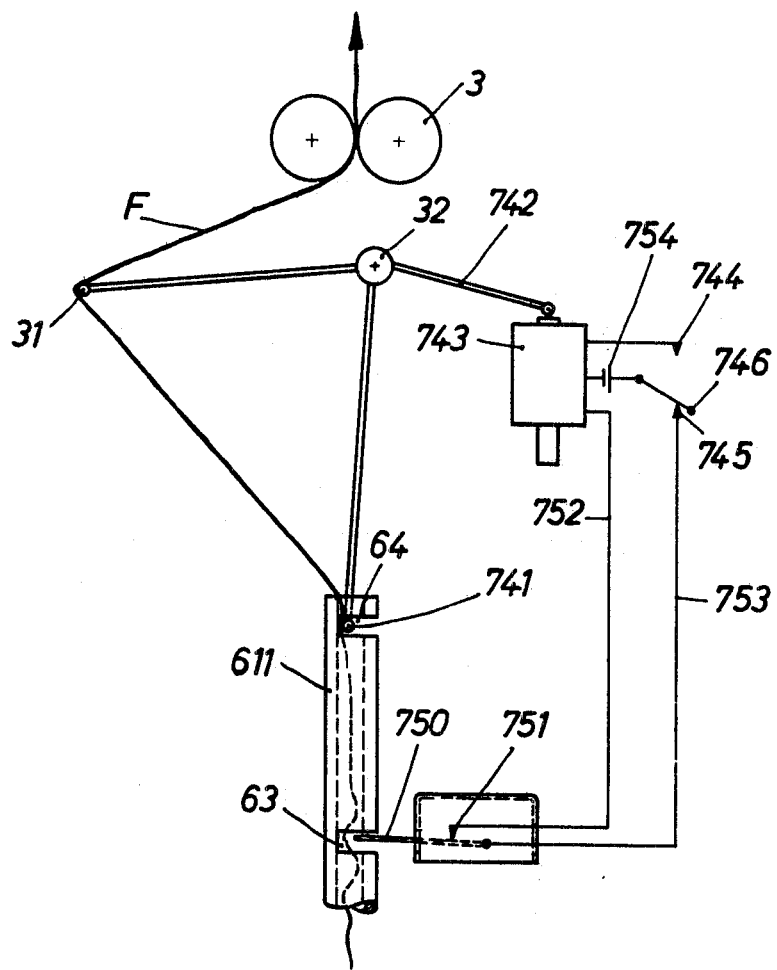

In FIGURES 9, 10 and 11 another type of mechanism for automatically clamping the strand, releasing the clamp and reversing the strand to restart the spinning operation is shown. A pivot 32 has extending from it one arm having a strand guide 31 on its swinging end, a second arm having a thread clamping member 741 on its swinging end and an arm 742 connected to the core of a double-acting solenoid 743 having two magnetizing coils. The strand-withdrawal tube 611 has a slot 64 near its upper end to receive clamping member 741 and its arm so that the clamping member can swing into the tube and press the strand against the tube wall opposite the slot. Spaced below slot 64 in a second slot 63 for receiving a cantilever sensor arm 750 which is responsive to the absence of or decrease in tension of the strand. When the pressure of the strand on the sensor arm has decreased below a predetermined low value such arm engages switch contact 751.

The two coils of solenoid 743 are energized selectively by a single pole double-throw switch having a first contact 744 connected to the upper coil of the solenoid, a second contact 745 connected to the sensor-actuated switch arm 750 by lead 753 and a switch arm 746 selectively engageable with such contacts. Such switch arm is connected to one side of an electric current source, which may be a battery 754, and the other side of such electric current source is connected in common to both coils of solenoid 743. Contact 751 of the sensor switch is connected directly to the lower coil of solenoid 743 by lead 752. Switch 744, 745, 746 is normally in the position shown in FIGURE 9 in which switch arm 746 is engaged with contact 745.

When switch arm 746 is engaged with contact 745 and switch 751 is open, the solenoid is de-energized and its core is in its centered position as seen in FIGURE 9, guide 31 is in a position to increase the strand stretch between the withdrawal tube and the drawing rolls, and clamping member 741 is at the right of withdrawal tube 611. When the tension in strand F decreases sufficiently so that the sensor switch arm 750 engages contact 751, a circuit is completed through contact 745 and switch arm 746 to energize the lower coil of solenoid 743 so as to move its core downward. Such core movement swings arm 742 downward and swings clamping member 741 into clamping position in slot 64 of withdrawal tube 611 as shown in FIGURE 10. The drawing rolls would be de-energized at the same time that the solenoid is energized.

Simultaneously with movement of clamping member 741 into the clamping position of FIGURE 10, a limit switch is closed to effect movement of switch arm 746 into engagement with contact 744. Current flowing from battery 754 through switch arm 746 and contact 744 energizes the upper coil of solenoid 745 which moves the core upward to the position of FIGURE 11. Such core movement swings arm 742 to rotate pivot 32 in the counterclockwise direction from the position of FIGURE 10.

This pivot rotation moves the clamping piece 741 out of slot 64 in tube 611 and guide 31 is moved toward alignment with the tube axis as shown in FIGURE 11 to feed strand F back into the withdrawal tube. A further limit switch, closed in synchronism with movement of the solenoid core to its uppermost position, may be provided to start drawing rolls 3 so that the spinning machine can be automatically restarted and to return the clamping and guiding mechanism to its normal position of FIGURE 9. If it is desired to shut down the spinning machine, a master switch would override the automatic mechanism, but such master control should not take effect until the strand is clamped by member 741.

Figure 7:
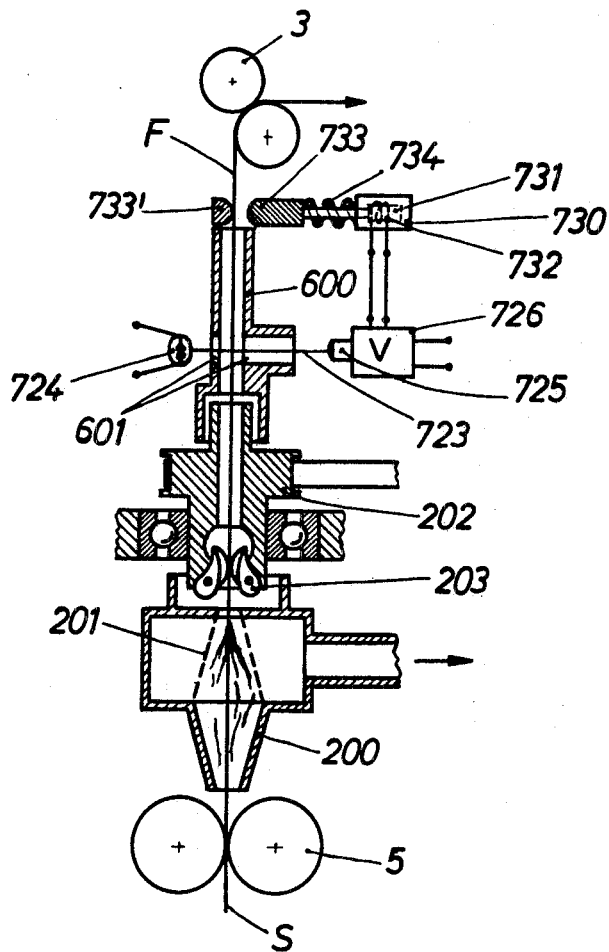
FIGURE 7 is a longitudinal section through another type of spinning apparatus including a clamping mechanism and FIGURE 8 is a longitudinal section through still another type of spinning apparatus including modified clamping mechanism.
Figure 8:
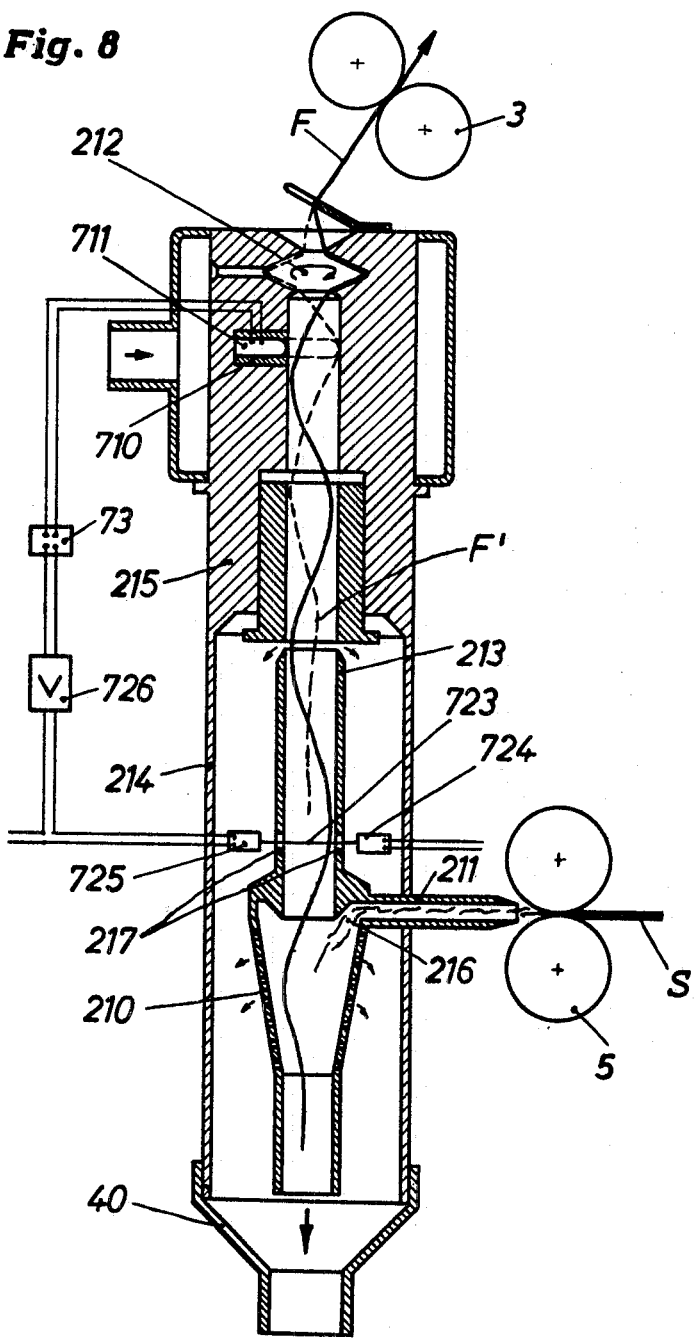

The clamping mechanism of the present invention is not limited to spinning apparatus having a rotating spinning chamber of the type shown in FIGURES 1 and and 2 and can be adapted for use with most types of continuous spinning apparatus. Three different types of spinning apparatus are shown in FIGURES 6, 7 and 8 having clamping mechanism according to the present invention.

Figure 6:
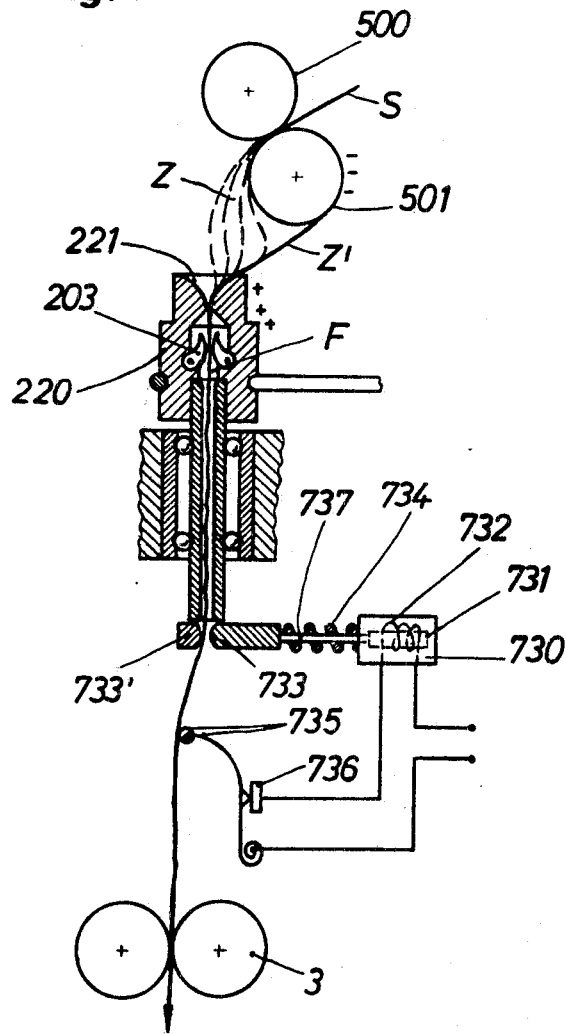
FIGURE 6 is a diagrammatic longitudinal section through spinning apparatus different from that of FIGURES 1 through 5 including strand-clamping mechanism.

An electrostatic open-end spinning device shown in FIGURE 6 includes supply rollers 500 and 501 between which fiber sliver S is fed. Initially, the fiber tends to be fluffed and separated as indicated at Z, but the lower roller 501 is charged with a negative potential so that the fiber adheres to such roller and tends to be carried around with it. A fiber collection surface 221 is charged with a positive potential and the strand portion Z' is pulled from roller 501 by such positive charge. Housing 220, including collection surface 221 and a strand-withdrawal tube, is mounted for rotation to twist a portion of the strand F. Cams 203 in the housing bear against opposite sides of the strand to brake its speed of travel through the housing and withdrawal tube to effect yarn twist more positively. Because the withdrawal tube is rotated, the strand-clamping mechanism is located outside of but closely adjacent to the strand discharge end of the tube.

Such clamping mechanism includes clamping members 733 and 733' at diametrically opposite sides of the withdrawal tube. Member 733' is stationary and member 733 is mounted on one end of a rod 737, such rod being an extension of the core 731 of solenoid 730. A compression spring 734 encircles rod 737 and has one end bearing on the solenoid housing and its opposite end bearing against clamping member 733.

A sensor 735 includes a strand-engaging member mounted on a resilient arm. By tension in the strand exerting pressure on the strand-engaging member such arm is held in engagement with contact 736 during normal spinning to energize coil 734 of solenoid 730 and thereby to hold clamping member 733 out of engagement with member 733'. When the yarn tension is reduced, the resilient arm of sensor 735 disengages contact 736, thereby de-energizing the solenoid so that compression spring 734 will urge clamping member 733 to the left, as seen in FIGURE 6, to clamp the strand against member 733'. If desired, both clamping members 733 and 733' could be mounted for simultaneous reciprocation toward and away from each other.

In FIGURE 7, spinning apparatus having a housing 200, including a stationary strand-forming chamber having a screen 201 forming the fiber collection surface, is shown. In this machine twist is effected in the strand by a rotatable housing 202 interposed between the collection chamber and withdrawal tube 600. The strand-clamping apparatus is similar to that shown in FIGURE 6 and includes clamping members 733 and 733', spring 734 and solenoid 730. In this instance, however, withdrawal tube 600 has diametrically aligned windows 601 in its opposite sides. A light source 724 casts a beam of light 723 onto photoelectric cell 725. If the strand should break, the absence of a strand stretch between windows 601 would permit a stronger light signal to be impressed on cell 725, which signal, amplified by amplifier 726, would actuate suitable mechanism to de-energize solenoid coil 732 and thereby permit spring 734 to urge clamp member 733 to the left, as seen in FIGURE 7, to clamp strand F against member 733'.

Photoelectric sensing means, such as described in connection with FIGURE 7, could be used with a rotating-withdrawal tube, such as shown in FIGURE 6. An annular window could be provided in the tube to permit passage of a light beam during such tube rotation.

A pneumatic spinning device is shown in FIGURE 8 in which fiber sliver is fed through rolls 5 and fiber is drawn by suction from the sliver through feed tube 211 into collection chamber 210. The housing for this spinning apparatus includes a lower hollow chamber 214 having an opening 40 in its lower end for applying suction to the chamber. Withdrawal tube 213 is spaced slightly from the upper housing section 215. The upper housing portion is a cylinder having a bore smaller than that of the lower section, which bore defines an extension of withdrawal tube 213. A twist-imparting chamber 212 in the upper portion of this section is aligned with the composite withdrawal tube. Air is supplied to the twist-imparting chamber to induce the strand to spin around the periphery of the chamber to effect twist. The air supply to the twist-imparting chamber is drawn by suction, applied at opening 40, down through the strand passage and may be vented at various locations, as indicated by the arrows in housing portion 214. Vent perforations provided in strand-forming chamber 210 draw fibers to the walls of such chamber. As the free strand end is flipped around the collection chamber by the rotation of the strand portion in the twist-impartinig chamber, such strand end scavenges the fiber from the walls.

In this type of apparatus the strand is not under substantial tension, but it may be pulled out of the strand-forming chamber, such as when the machine is to be shut down or if insufficient fiber is fed to the strand-forming chamber to continue the spinning. An electromagnet encircles clamping slide 711 located in a bore extending transversely of and communicating with the upper housing section bore. The slide is respectively movable by the electromagnet into and out of a clamping position in which such slide bears against the diametrically opposite passage wall by reversing the polarity of the electromagnet. The clamp-actuating sensor is a photoelectric cell 725 which receives a light beam 723 from light source 724 through windows 217 in withdrawal tube 213, similar to that described in connection with FIGURE 7.

A guide, such as guide 30 shown in FIGURE 5 and described above, may be provided between the strand clamp 711 and drawing rollers 3 in any of the devices shown in FIGURES 1, 7 and 8 to increase the strand stretch between them. Such guide is movable to make the stretch sufficiently slack to permit it to drop into the fiber collection area to resume the spinning operation after the clamp is released.

The clamp members may be normally closely adjacent to each other to engage and work on the surface of the strand or yarn passing between them, such as to facilitate smoothing the strand surface, or to supplement or replace braking cams such as shown in FIGURES 6 and 7. In such case the movable clamp member would be moved out of engagement with the strand only to permit unhindered manipulation of the strand in returning its free end to the strand-forming chamber.

We claim:

1. In spinning apparatus including a strand-forming chamber, a strand-withdrawal device having a stretch of strand movable longitudinally from such strand-forming chamber to the strand-withdrawal device, and strand-withdrawal tube means between the strand-forming chamber and the strand-withdrawal device, the improvement comprising clamping means independent of the strand-withdrawal device, located between the strand-withdrawal device and the strand-forming chamber and actuatable to clamp the strand stretch against longitudinal movement, sensing means for sensing a predetermined change in spinning conditions, and actuating means operated by said sensing means for actuating said clamping means.

2. In the spinning apparatus defined in claim 1, strand-guiding means between the clamping means and the strand-withdrawal device and offset from a straight line extending between the discharge end of the withdrawal tube and such strand-withdrawal device for guiding the strand stretch and movable toward such line to provide slack in such strand stretch.

3. In the spinning apparatus defined in claim 1, the sensing means being responsive to changes in tension of the strand stretch.

4. In the spinning apparatus defined in claim 1, the strand-forming chamber being a rotary chamber, and the sensing means being responsive to changes in pressure in the rotary chamber.

5. In the spinning apparatus defined in claim 1, the sensing means is a pressure-sensitive switch.

6. In the spinning apparatus defined in claim 1, the actuating means including electromagnet means.

7. In the spinning apparatus defined in claim 1, the actuating means including spring means.

8. In the spinning apparatus defined in claim 1, the actuating means including pneumatic means.

9. In the spinning apparatus defined in claim 1, the clamping means including a reciprocable slide.

10. In the spinning apparatus defined in claim 9, the slide being located exteriorly of but closely adjacent to the end of the withdrawal tube closer to the strand-withdrawing device.

11. In the spinning apparatus defined in claim 1, the strand-withdrawal tube having a slot therein through which the clamping means is movable.

12. In the spinning apparatus defined in claim 1, the clamping means including a resilient tube through which the strand extends and which is contractable to grip the strand.

13. In the spinning apparatus defined in claim 1, the clamping means including a pivoted three arm lever, one arm having a clamping member on its end operable to clamp or release the strand stretch, the second arm having a strand-guiding member on its end operable to hold the portion of the strand stretch between said clamping member and the strand-withdrawal device out of alignment with a straight line extending between the strand-withdrawal device and the end of the strand-withdrawal tube means nearer the strand-withdrawal device when said clamping member is in its strand-clamping position and movable toward such alignment to provide slack in such portion of the strand stretch when said clamping member is moved to its strand-releasing position, and the third arm being connected to the actuating means to move said lever between its strand-clamping position and its strand-releasing position.

14. In spinning apparatus including a strand-forming chamber and a strand-withdrawal device having a stretch of strand movable from such strand-forming chamber to the strand-withdrawal device, the improvement comprising clamping means actuatable to clamp the strand stretch against longitudinal movement by the strand-withdrawal device and to release the strand for longitudinal movement by the strand-withdrawal device, sensing means for sensing a predetermined change in spinning conditions, back-delivery means to deliver such stretch of strand back into the strand-forming chamber, and actuating means operated by said sensing means for effecting strand-clamping operation of said clamping means and by said back-delivery means for releasing said strand-clamping means.

15. In a method of continuously spinning yarn, including supplying fiber sliver to a strand-forming chamber of spinning apparatus, resolving such sliver into individual fibers, forming a strand, drawing such strand with a strand-withdrawal device longitudinally from the strand-forming chamber, imparting twist to such strand, and drawing the twisted strand longitudinally from the spinning apparatus, the steps of sensing a discontinuity in the strand forming, twisting and drawing steps, and clamping the strand at a location between the strand-forming chamber and the strand-withdrawal device against longitudinal movement upon the occurrence of such discontinuity.

16. In the method defined in claim 15, the further steps of releasing the clamped thread, and returning to the strand-forming chamber a portion of the strand stretch between the strand-withdrawal device and the strand-forming chamber.

References Cited

UNITED STATES PATENTS

| | | | |
|---|---|---|---|
| 3,334,479 | 8/1967 | Mikulecky et al. | 57—34 |
| 3,354,626 | 11/1967 | Cizek et al. | 57—78 |
| 3,354,627 | 11/1967 | Cizek et al. | 57—81 |
| 3,354,631 | 11/1967 | Elias et al. | 57—58.95 |
| 3,355,868 | 12/1967 | Civrny et al. | 57—58.95 |

JOHN PETRAKES, Primary Examiner

U.S. Cl. X.R.

57—58.89, 58.95, 83